US007797428B2

(12) United States Patent
Jung et al.

(10) Patent No.: US 7,797,428 B2
(45) Date of Patent: Sep. 14, 2010

(54) SYSTEM AND METHOD FOR PROVIDING IP-BASED SERVICE IN A COMMUNICATION SYSTEM

(75) Inventors: Joon-Ho Jung, Suwon-si (KR); Young-Ky Kim, Seoul (KR); Young-Ki Jeon, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 885 days.

(21) Appl. No.: 11/599,082

(22) Filed: Nov. 14, 2006

(65) Prior Publication Data
US 2007/0127451 A1 Jun. 7, 2007

(30) Foreign Application Priority Data
Nov. 14, 2005 (KR) .................. 10-2005-0108817

(51) Int. Cl.
*G06F 15/16* (2006.01)
(52) U.S. Cl. ............... 709/227; 709/228; 709/229; 709/250; 370/465; 340/825; 713/1
(58) Field of Classification Search ............ 709/203, 709/229, 219; 370/352, 401; 455/414.1, 455/419, 435.2; 380/30, 278; 713/168
See application file for complete search history.

(56) References Cited

U.S. PATENT DOCUMENTS

| 6,477,708 | B1 * | 11/2002 | Sawa .................... 725/116 |
| 2002/0029261 | A1 * | 3/2002 | Shibata .................. 709/219 |
| 2002/0109718 | A1 * | 8/2002 | Mansour et al. ......... 345/744 |
| 2002/0111995 | A1 * | 8/2002 | Mansour et al. ......... 709/203 |
| 2003/0151621 | A1 * | 8/2003 | McEvilly et al. ........ 345/744 |
| 2004/0010685 | A1 * | 1/2004 | Sakaguchi et al. ....... 713/168 |
| 2004/0043758 | A1 * | 3/2004 | Sorvari et al. ......... 455/414.1 |
| 2004/0176958 | A1 * | 9/2004 | Salmenkaita et al. ..... 704/275 |
| 2004/0192282 | A1 * | 9/2004 | Vasudevan .............. 455/419 |
| 2005/0227692 | A1 * | 10/2005 | Kawashima et al. ..... 455/435.2 |
| 2005/0289596 | A1 * | 12/2005 | Ku et al. ................. 725/51 |
| 2006/0112182 | A1 * | 5/2006 | Chen et al. .............. 709/229 |
| 2006/0165083 | A1 | 7/2006 | Lee |
| 2006/0268835 | A1 * | 11/2006 | Hyotylainen et al. ..... 370/352 |
| 2006/0268904 | A1 * | 11/2006 | Bae et al. ............... 370/401 |
| 2007/0086590 | A1 * | 4/2007 | Blom ..................... 380/278 |
| 2007/0124587 | A1 * | 5/2007 | Krishnamurthi et al. ... 713/168 |
| 2007/0150822 | A1 * | 6/2007 | Mansour et al. ......... 715/762 |
| 2007/0157247 | A1 * | 7/2007 | Cordray et al. ........... 725/47 |
| 2007/0160201 | A1 * | 7/2007 | Blom et al. .............. 380/30 |

FOREIGN PATENT DOCUMENTS

| KR | 1020030088928 | 11/2003 |
| KR | 1020040039099 | 5/2004 |
| KR | 1020060021562 | 3/2006 |
| KR | 1020060035323 | 4/2006 |

* cited by examiner

*Primary Examiner*—Wing F Chan
*Assistant Examiner*—Michael Martinez
(74) *Attorney, Agent, or Firm*—The Farrell Law Firm, LLP

(57) ABSTRACT

A system and method for providing an Internet Protocol (IP)-based service in a communication system are provided. In an IP Multimedia Subsystem (IMS) communication system, a menu server generates a service object based on service capability information of a subscriber received from a service provider, and a terminal activates the service object received from the menu server so that the subscriber can easily use services. The user can select one of services from a service menu displayed on the terminal and immediately implement the selected service.

26 Claims, 6 Drawing Sheets

SYSTEM AND METHOD FOR PROVIDING IP-BASED SERVICE IN A COMMUNICATION SYSTEM

PRIORITY

This application claims priority under 35 U.S.C. §119 to an application entitled "System and Method for Providing IP-Based Service in a Communication System" filed in the Korean Intellectual Property Office on Nov. 14, 2005 and assigned Serial No. 2005-108817, the contents of which are incorporated herein by reference.

BACKGROUND OF THE INVENTION

1. Field of the Invention

The present invention relates generally to a communication service system in a communication system, and in particular, to a system and method for providing Internet Protocol (IP)-based services.

2. Description of the Related Art

An IP Multimedia Subsystem (IMS) has been proposed to provide IP-based packet communication services. The IMS operates based on a Session Initiation Protocol (SIP) being a text-based application layer control protocol. The SIP is based on a client/server mechanism in which a server responds when clients start to page.

SIP interfaces are used to enable Instant Messaging (IM) and MultiMedia Conference (MMC). IM is a computer application that allows instant text communications among two or more users over a network such as the Internet. MMC is a service in which a plurality of participants is involved a conference wherein the participants hear and view one another and audio and video data is sent/received.

Additionally, a variety of communication services have emerged, such as Wireless Local Area Network (WLAN), Wireless Broadband Internet (WiBro), Worldwide Interoperability for Microwave Access (WiMax) and High Speed Downlink Packet Access (HSDPA). Through these interfaces, diverse communication services are available to users.

Major communication interfaces include Code Division Multiple Access (CDMA) adopted for voice service in Korea, WLAN in which a Personal Digital Assistant (PDA) or a laptop computer accesses the Internet at a very high rate within the service area of an Access Point (AP), 2.3 GHz portable Internet WiBro for high-quality, high-speed multimedia data based on Quality of Service (QoS) including audio and video as well as data, and HSDPA being a $3.5^{th}$ generation (3.5 G) version that increases wireless Internet download rate to that of a Personal Computer (PC) and provides high QoS-based voice/video calls and high-quality data service.

Through the communication interfaces, communication services are provided, such as Voice over IP (VoIP), Video Telephony (VT), Push-To-Talk (PTT), Push-To-Video (PTV), Push-To-Data (PTD), Push-To-All (PTA), IM and MMC.

VoIP is a telephony service that delivers voice packets over an IP packet, and VT adds video data to VoIP in a user's communication with the other party.

PTT has emerged along with the trend that every wired/wireless network environment supporting a point-to-multipoint call over a packet network being a wireless Internet is merged and evolved to IP.

PTT is a half-duplex communication service using a dedicated channel, in which a member communicates with other members in the same group through terminals.

PTV is a technology that allows one user to transmit live video to a plurality of users. The unidirectional transmission is sent to the plurality of users for a time period desired by the user.

PTD is a service that sends data to a plurality of users simultaneously.

PTA supports and enables all of the PTT, PTV and PTD services.

The above-described communication services can be provided in application to an asynchronous $2.5^{th}$ generation (2.5 G) terminal, an Enhanced Data rates for GPRS Evolution terminal, a Wideband CDMA (WCDMA) terminal, a WiFI terminal and networks associated to the terminals.

While the diversification of communication schemes enables provisioning of various services to subscribers through their terminals in their communication systems, in practice, they are confined to their subscribed services. Also, even if a subscriber wants to receive a subscribed service, there is no way in efficiently finding out which service is available through his terminal. Accordingly, there is a need for associating the display of a terminal with functions for implementing services to increase the display utilization of the terminal and meet various demands from subscribers along with the trend of providing increasing services via communication interfaces.

Also, it is necessary to download or upgrade a service application required to implement the subscribed service in the terminal when the user intends to receive the service.

SUMMARY OF THE INVENTION

An object of the present invention is to substantially solve at least the above problems and/or disadvantages and to provide at least the advantages below. Accordingly, the present invention provides a system and method for providing IP-based services on a subscriber-by-subscriber basis so that a subscriber can easily receive available services.

According to the present invention, in a system for providing an IP-based service in a communication system, a server manages subscriber service capability information for providing services on a user-by-user basis according to services subscribed by users, and provides service objects on a user-by-user basis according to the service capability information. A terminal activates a service object received from the server.

According to the present invention, in a method of providing an IP-based service in a communication system, a menu server receives a registration request from a terminal and checks a status of the terminal. The menu server generates a service menu for the terminal according to the status of the terminal. The menu server authenticates the terminal and downloads the service menu to the terminal so that the service menu can be displayed on the terminal, when the authentication is completed.

According to the present invention, in a method of providing an IP-based service in a communication system, a terminal transmits a version check message of a service menu that it has to a menu server after requesting registration request to the menu server. The terminal receives a version check response message including a result of authenticating the terminal from the menu server and authenticates the menu server. If the authentication is successful, the terminal determines a service menu to be downloaded based on version information of a latest service menu included in the version check response message. The terminal transmits a service menu download message to the menu server, downloads the latest service menu from the menu server and displays the latest service menu.

According to the present invention, in a method of providing an IP-based service in a communication system, a server compares service capability information based on services subscribed by a user with current service information of a terminal of the user received from the terminal, and transmits a service object to the terminal by the server, if the service capability information of the user is different from the service information of the terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention discloses a function of facilitating a user to use an available service object. For this purpose, an IMS communication system is configured to include a menu server for generating and providing a service object based on subscriber service capability information provided by a service provider, and a terminal for activating the service object received from the menu server so that a user can easily receive the service. In accordance with the present invention, the service object can be a menu about the subscribed services of the user or a user application that implements the subscribed services.

In this manner, the user can easily select and implement a service from a service menu displayed on the terminal. This service menu is configured within the terminal based on the service menu received from the menu server. Alternatively, the menu server configures a display of the service menu and the terminal downloads it from the menu server by communications.

The IMS communication system of the present invention may further include a contents server for storing, managing and providing a service application required for the terminal to implement a service. The functionality of the contents server may be incorporated into the menu server. The service application is also called a client program.

Figure 1:
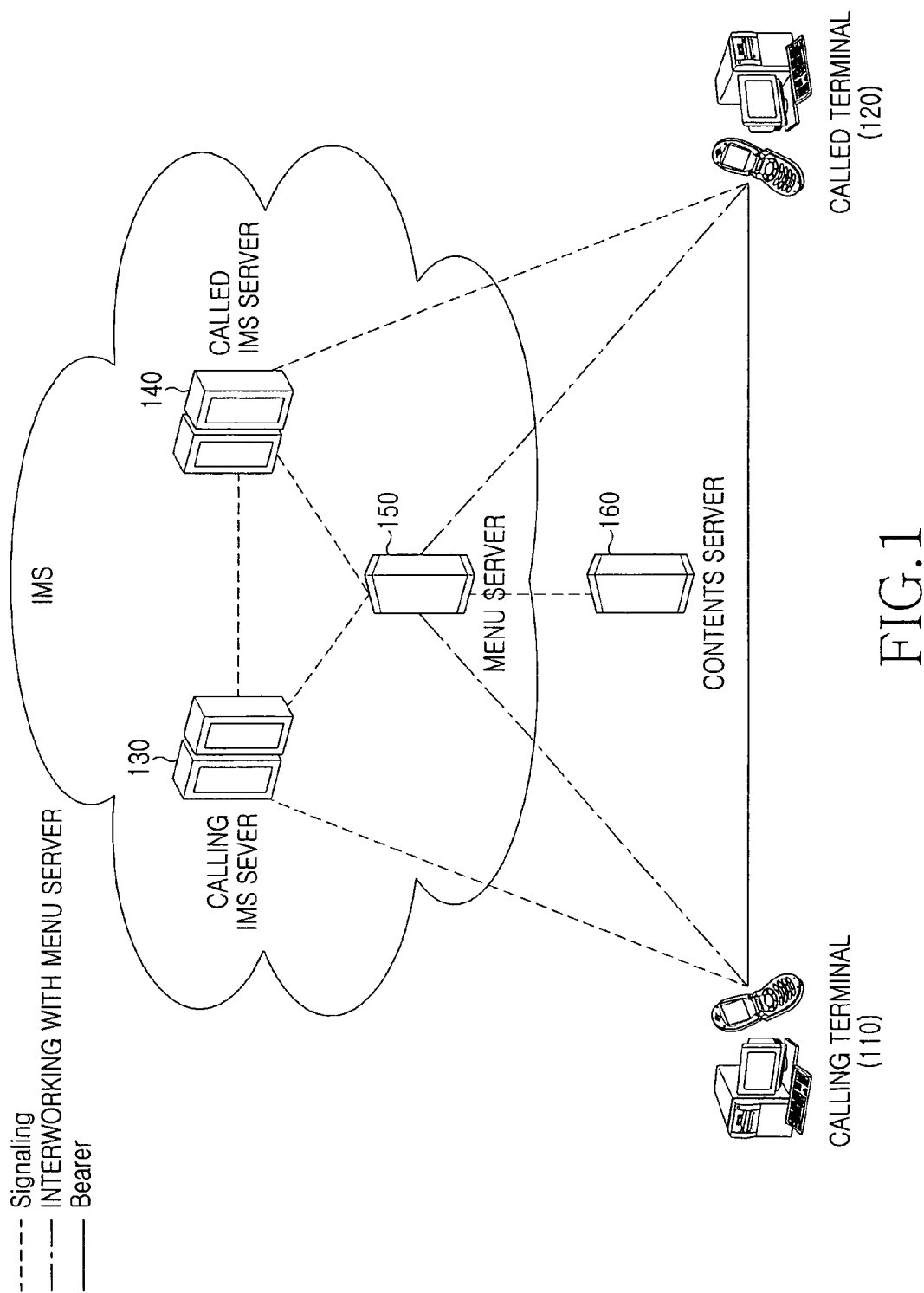
FIG. 1 illustrates the configuration of a communication system for providing services on a subscriber-by-subscriber basis according to the present invention.

FIG. 1 illustrates the configuration of a communication system for providing services on a subscriber-by-subscriber basis according to the present invention. Referring to FIG. 1, the communication system includes a calling terminal 110, a called terminal 120, a calling IMS server 130 for processing a session for the calling terminal 110, a called IMS server 140 for processing a session for the called terminal 120, a menu server 150 for providing service menus to the terminals 110 and 120, and a contents server 160.

In operation, the calling terminal 110 and the called terminal 120 can be wired, wireless or dual wired/wireless terminals. They are supposed to have processing power enough to reproduce multimedia portal contents. These terminals 110 and 120 are connected to the menu server 150 after registration and receive a service menu from the menu server 150. Alternatively, the terminals 110 and 120 configure a service menu screen based on a service menu received from the menu server 150. The terminals 110 and 120 can download a client program for a necessary service and subscribe to a service through the service menu screen.

The calling IMS server 130 and the called IMS server 140 are responsible for call setup and call release between the calling terminal 110 and the called terminal 120.

The menu server 150 generates a service menu for a subscriber based on the subscriber service capability information of the subscriber and provides the service menu to the subscriber terminal. The subscriber service capability information refers to information about subscribed services and free services. The menu server 150 also generates a new service menu referring to terminal capability information each time a new service is added and provides it to the subscriber terminal, so that the subscriber terminal updates its service menu. One subscriber may use one or more terminals and different service menus may be created depending on the specifications of the terminals. Thus, the menu server 150 refers to the terminal capability information of each terminal.

To allow the subscriber to use the new service through the updated service menu, the menu server 150 may provide a client program required to implement the new service. When the subscriber needs a client program for a service, it can request the client program to the menu server 150. Thus, the menu server 150 can store, manage and distribute a client program for each service to terminals. To do so, the functionality of a contents server is built into the menu server 150 or the menu server 150 operates with the external contents server 160.

The contents server 160 maintains and manages multimedia portal contents including Hyper Text Transfer Protocol (HTTP), Wireless Application Protocol (WAP), and flash animation as well as audio, video, images and messages. That is, the contents server 160 can be integrated in the menu server 150 or configured separately from the menu server 150.

Also, the menu server 150 compares subscriber service capability information based on the subscribed services of a user with service information about service objects loaded on the terminal of the user. If the subscriber service capability information is different from the service information, the menu server 150 downloads service objects to the terminal according to the subscriber service capability information. The menu server 150 can download all of service objects for the terminal or only service objects for update. This operation of the menu server 150 may be performed in the same manner in the contents server 160.

Figure 2:
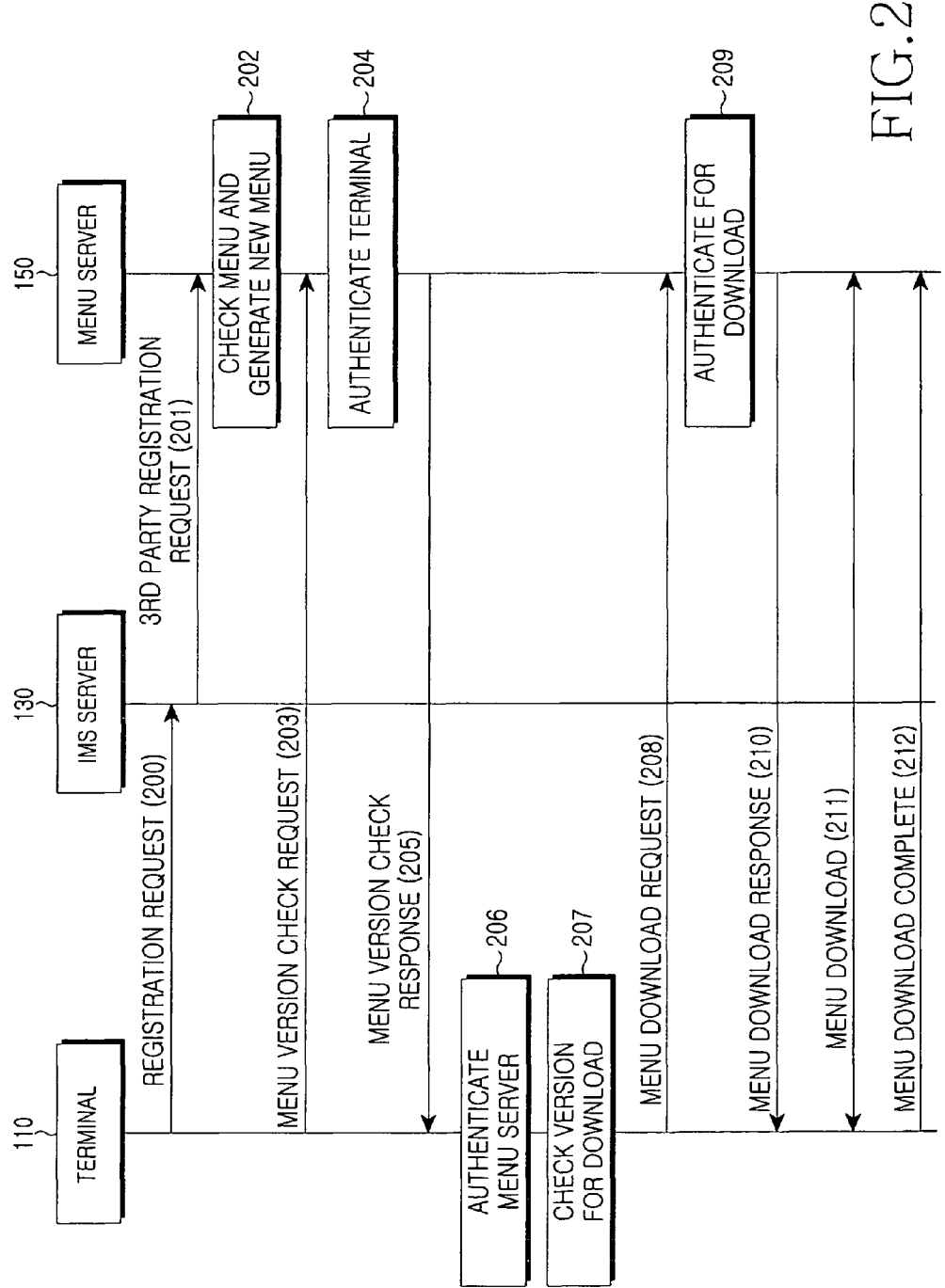
FIG. 2 is a diagram illustrating a signal flow for receiving a service menu according to the version of the service menu according to the present invention.
Figure 3:
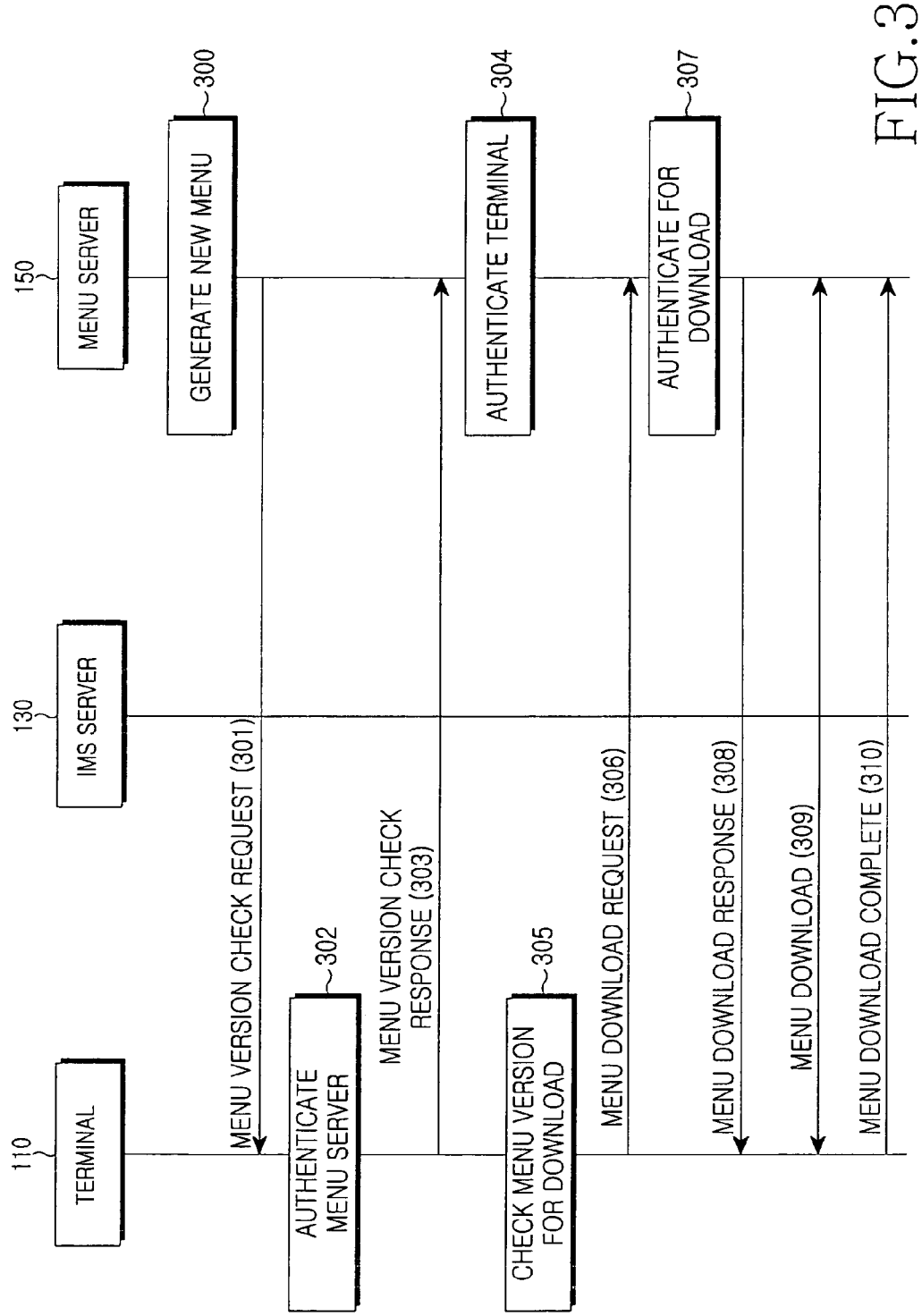
FIG. 3 is a diagram illustrating a signal flow for upgrading an existing service menu as a new service menu is created according to the present invention.

FIG. 2 is a diagram illustrating a signal flow for receiving a service menu according to the present invention and FIG. 3 is a diagram illustrating a signal flow for upgrading a service menu as a new service menu is created according to the present invention. Therefore, FIGS. 2 and 3 will be described below in the context of the terminal 110 and the IMS server 130.

The terminal 110 checks the version of a service menu to be provided to the subscriber in conjunction with the menu server 150 during registration. In the presence of a service menu of a new version, the terminal 110 receives the new service menu from the menu server 150 and displays it.

More specifically, upon power-on, the terminal 110 transmits a registration request message to the IMS server 130 responsible for registration in step 200. The IMS server then transmits $3^{rd}$ party registration request message to the menu server 150 in step 201.

The menu server 150 is aware that subscriber using the terminal (110) has registered from the received $3^{rd}$ party registration request. In step 202, the menu server 150 thus checks a service menu for the subscriber and generates a new service menu when needed. Specifically, the menu server 150 checks a service menu necessary to the subscriber based on the subscriber service capability information of the subscriber and the terminal capability information of the terminal 110 of the subscriber, to determine whether there already exists a service menu provided by a service provider. The menu server 150 alternatively determines whether there is a service menu needed to the subscriber among service menus for subscribers that the menu server 150 manages.

In the absence of any service menu available to the subscriber, the menu server 150 generates a new service menu suitable for the characteristics of the terminal 110 based on the subscriber service capability information and the terminal capability information. The subscriber service capability information and the terminal capability information can be acquired in many ways. For example, the terminal 110 sends its subscriber service capability information and terminal capability information to the IMS server 130 during registration. Then the menu server 150 acquires the subscriber service capability information and terminal capability information from the IMS server 130 by an SIP "reg" event package.

While the menu server 150 checks the service menu and generates the new service menu when needed, the terminal 110 transmits a menu version check request message to the menu server 150 by directly connecting to the menu server 150 to determine whether a service menu that the terminal 110 has is of the latest version in step 203. The menu server 150 authenticates the terminal 110 using a preserved equipment ID of the terminal 110 and a service provider-specific authentication key in step 204 and transmits a menu version check response message indicating the result of the authentication to the terminal 110 in step 205.

The response can be considered in the following respects. If the authentication fails, for example, if the terminal 110 is not supposed to receive a service menu, the menu server 150 transmits a menu version check response message indicating authentication failure to the terminal 110. However, if the authentication is passed, the menu server 150 transmits a menu version check response message with information about the latest version of the service menu and a random authentication key required for download of the service menu to the terminal 110.

Upon receipt of the menu version check response message, the terminal 110 authenticates the menu server using the service provider-specific authentication key received from the menu server 150. The service provider-specific authentication key is provided from the menu server 150 when the terminal 110 subscribes to a particular service, or included in the menu version check response message. In step 207, the terminal 110 checks the version of the service menu to be downloaded. That is, the terminal 110 compares the latest service menu version acquired from the response with the version of the current service menu of the terminal 110. The terminal 110 decides whether to download the service menu according to the comparison result. The terminal 110 may acquire the authentication key needed for download as well as the latest version information from the received response.

If it decides to download the service menu, the terminal 110 generates a menu download request message including information about the version of a service menu to be downloaded and the already acquired authentication key for the download and sends it to the menu server 150 in step 208.

In step 209, the menu server 150 authenticates the download using the authentication key included in the menu download request message. The result of the authentication, i.e. authentication success or failure can be set in a menu download response message. In step 210, the menu server 150 transmits the menu download response message to the terminal 110. If the authentication is passed, the menu server 150 starts to download the service menu to the terminal 110 in step 211. Thus, the terminal 110 receives the service menu with subscribed services. After the download is completed, the terminal 110 transmits a menu download complete message to the menu server 150 in step 212. Thus, the connection is released between the terminal 110 and the menu server 150.

Subsequently, the terminal 110 provides the subscriber with a service menu screen that is configured to facilitate the subscriber to receive a subscribed service. In this manner, the subscriber views all of his subscribed services listed in the service menu and can easily select a desired service. When the subscriber selects one of the services in the service menu, the service menu screen is shifted to a page for the selected service. Since the terminal 110 should be able to provide all the services displayed on the service menu screen, it should be equipped with a client program corresponding to each service. If the terminal 110 recognizes the absence of a client program for any service, it can request the client program directly to the menu server 150. Alternatively, the menu server 150 checks client programs that the terminal 110 preserves and when the service menu of the terminal 110 is updated, the menu server 150 sends corresponding client programs to the terminal 110 along with the updated service menu. These client programs are provided from the menu server 150 or from the external contents server via the menu server 150.

In accordance with the present invention, the downloaded service menu can be configured as a service menu screen suitable for the terminal 110. That is, the menu server 150 configures a service menu screen based on the subscriber service capability and the terminal capability information of the terminal 110 such that it can be displayed on the terminal 110 without any processing. The downloaded service menu can also be service menu information by which the terminal 110 configures a service menu screen.

As described above, downloading of the service menu requires authentication between the terminal 110 and the menu server 150, For the purpose of ensuring security between the terminal 110 and the menu server 150. Authentication information can be defined by the service provider. The terminal 110 can authenticate the menu sever 150 using the unique authentication key provided by the service provider, and the menu server 150 can authenticate the terminal 110 using the equipment ID of the terminal 110 and the unique authentication key. The authentication key shall be provisioned by the service provider when the terminal 110 is manufactured or at any other time.

Figure 4:
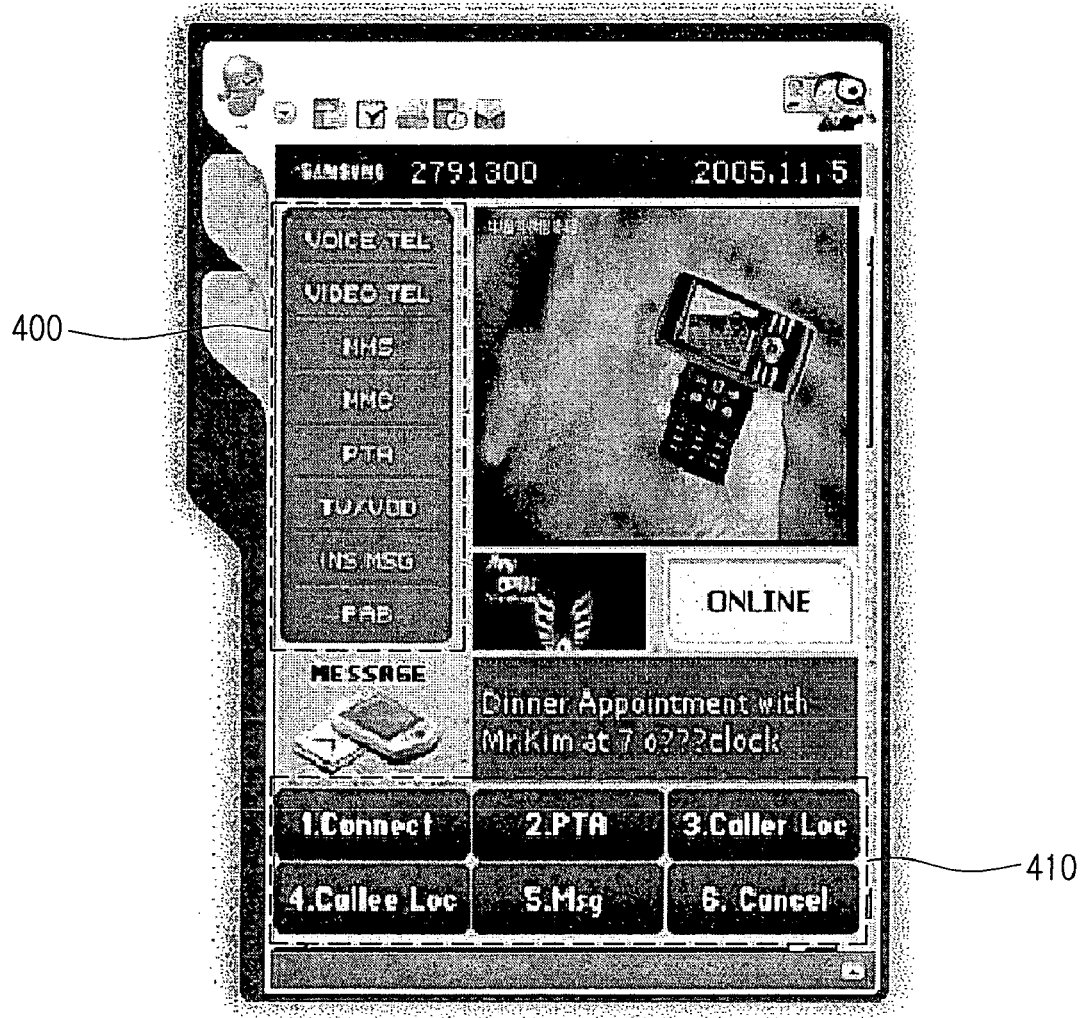
FIG. 4 is a service menu screen according to the present invention.

FIG. 3 is a diagram illustrating a signal flow for upgrading an existing service menu as a new service menu is created according to the present invention and FIG. 4 is a service menu screen according to the present invention.

Referring to FIG. 3, when the subscriber service capability information or the terminal capability information of the subscriber is changed, the menu server 150 generates a new service menu in step 300. The subscriber changes the subscriber service capability information or the terminal capability information through a browser provided by the service provider, or the service provider provides information about the capability change to the menu server 150. The subscriber service capability information or the terminal capability information can also be changed in any other manner.

In step 301, the menu server 150 transmits a menu version check request message to the terminal 110 to notify that the new service menu has been generated and thus the version of the service menu has been changed. The menu version check request message includes an authentication key required for download provided by the menu server 150. The terminal 110 authenticates the menu server 150 using the service provider-specific authentication key received from the menu server in step 302 and transmits a menu version response message to the menu server 150, confirming that the service menu version was changed in step 303. In step 304, the menu server 150 authenticates the terminal 110 using the equipment ID of the terminal 110 and the service provider-specific authentication key. After the authentication, the terminal 110 receives the new service menu from the menu server 150 in steps 305 to 310 in the same manner as steps 207 to 212 in FIG. 2.

When the new service menu is completely downloaded, a service menu screen can be displayed on the terminal 110 as illustrated in FIG. 4. The service menu received from the menu server 150 is displayed in a part 400 and frequently used services from the service menu are bookmarked so that they can be implemented by hot keys in a part 410. The services listed in the service menu may include the bookmarked services, or the part 410 may be empty if the subscriber bookmarks no intended service in the service menu. The bookmark part 410 is particularly useful when the number of services available to the subscriber exceeds that of services which can be listed in the service menu, for example, an intended service should be found by scrolling.

The service menu screen illustrated in FIG. 4 is a example to which the present invention is not limited. The service menu screen is provided as contents from the menu server 150 or configured based on downloaded service menu information by the terminal 110. A variety of service menu screens can be configured depending on selection of the subscriber, the service provider or the terminal manufacturer.

A procedure of checking client programs required for implementing various subscribed services and downloading new client programs or clients programs of changed version from the contents server by the terminal will be described below. The contents server may be incorporated into or configured separately from the menu server.

Figure 5:
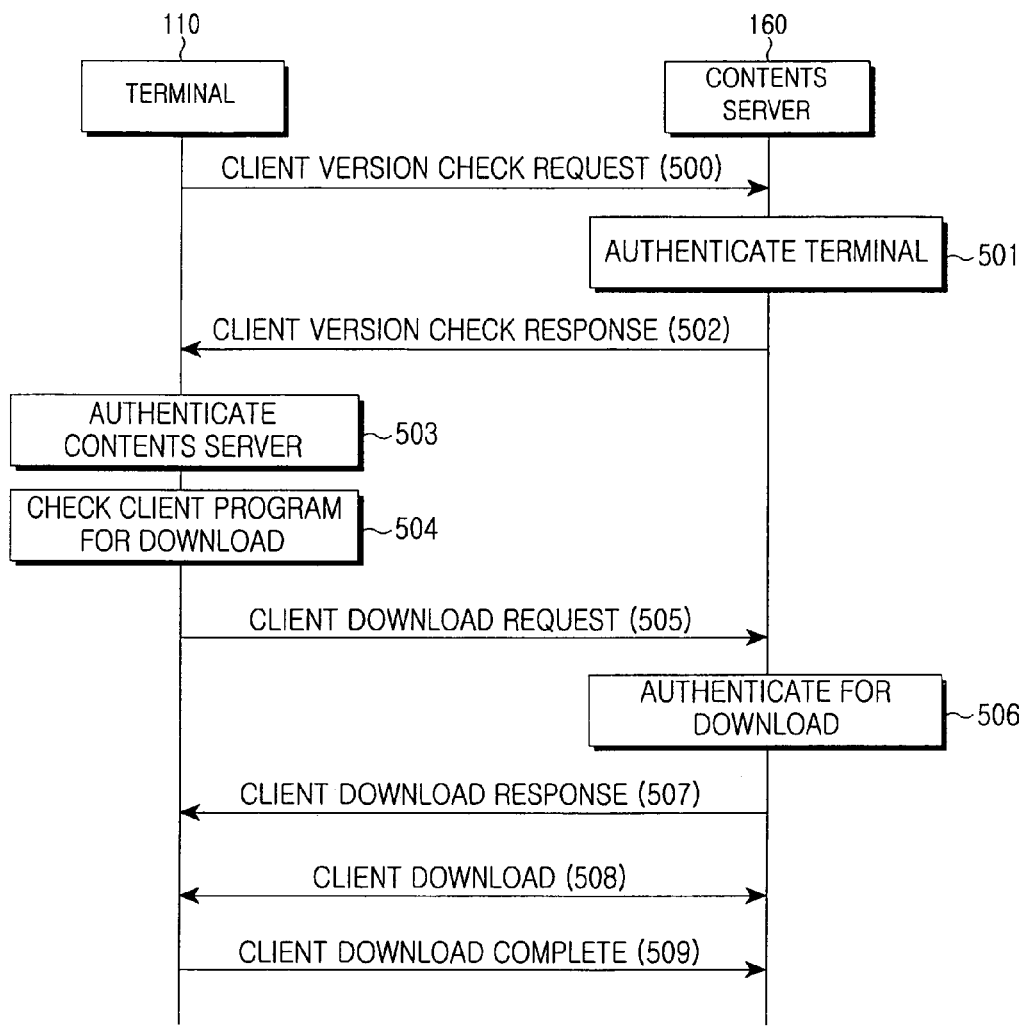
FIG. 5 is a flowchart illustrating an operation for checking the version of a client program and downloading the client program from a contents server in a terminal according to the present invention.
Figure 6:
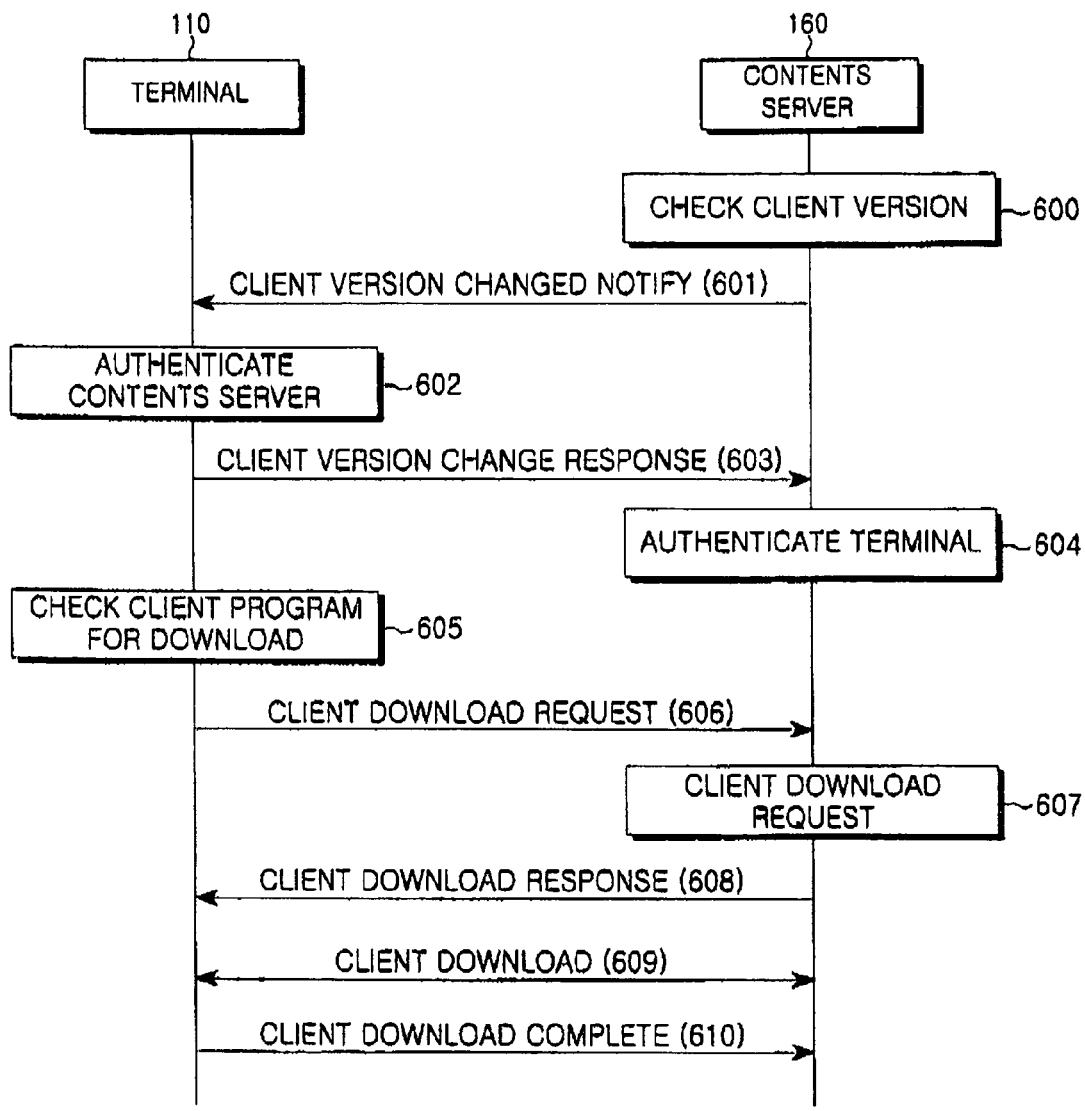
FIG. 6 is a flowchart illustrating an operation for checking the version of a client program and downloading the client program to the terminal in the contents server according to the present invention.

FIG. 5 is a flowchart illustrating an operation for checking the version of a client program and downloading the client program from the contents server in the terminal according to the present invention, and FIG. 6 is a flowchart illustrating an operation for checking the version of a client program and downloading the client program to the terminal in the contents server according to the present invention.

Referring to FIG. 5, in an operation for requesting a client program, the terminal 110 sends a client version check request to the contents server 160 to determine whether the terminal 110 has all necessary client programs to provide services and/or whether the client programs that the terminal 110 has are of the latest versions in step 500.

In step 501, the contents server 160 authenticates the terminal 110 using the equipment ID of the terminal 110 and the service provider-specific authentication key. The contents server 160 then replies to the terminal 110 with a client version check response message. If the authentication is failed, the client version check response indicates the authentication failure. If the authentication is successful, the client version check response message includes an updated client program list and a client program list to be downloaded. The contents server 160 also provides a random authentication key for downloading client programs to the terminal 110.

Upon receipt of the client lists from the contents server 160, the terminal 110 authenticates the content server 160 using the service provider-specific authentication key provided by the contents server 160 in step 503 and selects the client programs to be downloaded from the client program list in step 504.

In step 505, the terminal 110 transmits a client download request message to the contents server 160. The client download request message includes the list of client programs to be downloaded and the authentication key for downloading the client programs.

The contents server 160 authenticates the authentication key for downloading the client programs in step 506 and transmits a client download response including the result of the authentication to the terminal 110 in step 507. If the authentication is successful, the terminal 110 downloads the client programs from the contents server 160 in step 508 and transmits a client download complete message to the contents server 160 after the download is completed, in step 509.

FIG. 6 describes the procedure of requesting download of updated client programs to the terminal in the contents server. Referring to FIG. 6, the contents server 160 discovers that the versions of client programs have been changed in step 600 and transmits a client version changed notify message to the terminal 110 of the subscriber that has subscribed to services corresponding to the client versions in step 601. The contents server 160 notifies the terminal 110 of a client program list to be downloaded for each subscriber and an authentication key for downloading client programs by the client version changed notify. The contents server 160 does not send the client version changed notify message to a terminal that has downloaded the client programs of the changed versions.

In step 602, the terminal 110 authenticates the contents server 160 using the service provider-specific authentication key provided by the contents server 160. The terminal 110 transmits a client version changed response message confirming the change of the client program version to the contents server 160 in step 603. The contents server 160 authenticates the terminal 110 using the equipment ID of the terminal 110 and the service provider-specific authentication key in step 604.

In step 605, the terminal 110 acquires the client program list to be downloaded from the client version changed notify message and determines client programs to be downloaded. The terminal 110 transmits a list of client programs to be downloaded and the authentication key for downloading the client program to the contents server 160 by a client download request message in step 606.

In step 607, the contents server 160 authenticates the authentication key included in the client download request message and replies with a client download response message indicating the result of the authentication in step 608. If the authentication is successful, the terminal 110 downloads the client programs from the contents server 160 in step 609.

When the download is completed, the terminal 110 transmits a client download complete message to the contents server 160 in step 610.

While the menu server and/or the contents server and the terminal each perform authentication during registration and perform additional authentication each time an operation is carried out in the present invention, once the authentication is performed during registration, there is no additional authentication in downloading and any other operation while the session is on-going.

In accordance with the present invention, when a new service is added or needed, a client program for implementing the new service is directly provided to a terminal so that its subscriber can receive the new service without purchasing a terminal enabled with the new service. Also, since a service menu is provided on a subscriber-by-subscriber basis, the subscriber can use an intended service easily through a service menu displayed on the screen of the terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for providing an Internet Protocol (IP)-based service in a communication system, comprising:
   a server for managing subscriber service capability information for providing services on a user-by-user basis using subscribed services, and providing service objects on a user-by-user basis according to the subscriber service capability information; and
   a terminal for activating a service object received from the server,
   wherein, before providing the service objects, the server sends, to the terminal, a message including version information of the service objects and a server authentication key,
   wherein the terminal authenticates the server according to the server authentication key received from the server,
   wherein the terminal transmits a version check request message to the server to determine whether the current service object is of a latest version, receives a version check response message including latest version information from the server, and decides whether to download the new service object using the version check response message, and
   wherein when the subscriber service capability information is changed, the server transmits a version changed notify message of the service object to the terminal, and upon receipt of a download request message in response to the version changed notify message from the terminal, the server transmits the service object to the terminal.

2. The system of claim 1, wherein the service object is a service menu about subscribed services of the terminal.

3. The system of claim 1, wherein the service object is a user application for implementing the subscribed services.

4. The system of claim 1, wherein upon receipt of a registration request from the terminal, the server compares information about a current service object included in the registration request with the subscriber capability information of the user and generates a new service object for the terminal using the subscriber service capability information, if the current service object information is different from the subscriber service capability information, and transmits the new service object to the terminal.

5. The system of claim 4, wherein the server generates the new service object for the terminal using the subscriber service capability information of the user and terminal capability information of the terminal.

6. The system of claim 2, wherein upon receipt of the service menu from the server, the terminal configures a service menu screen using the service menu and displays the service menu screen.

7. The system of claim 2, wherein the terminal receives a service menu screen with the subscribed services from the server and displays the service menu screen.

8. A method of providing an Internet Protocol (IP)-based service in a communication system, comprising the steps of:
   receiving a registration request message from a terminal by a menu server; checking a status of the terminal by the menu server;
   generating a service menu for the terminal according to the status of the terminal; first-authenticating the terminal;
   downloading the service menu to the terminal so that the service menu can be displayed on the terminal, when the first authentication is completed; and
   generating a new service menu by the menu server, if one of the subscribed service capability information and terminal capability information is changed;
   transmitting a version changed notify message of the service menu to the terminal;
   second-authenticating the terminal, upon receipt the version changed notify message from the terminal;
   determining to download the new service menu to the terminal, upon receipt of a download request message from the terminal after the second authentication; and
   transmitting the new service menu to the terminal so that the service menu can be displayed on the terminal,
   wherein, before providing the service menu, the menu server sends, to the terminal, a message including version information of the service menu and a server authentication key, and
   wherein the terminal authenticates the menu server according to the server authentication key received from the menu server.

9. The method of claim 8, wherein receiving the registration request message further comprises receiving a third party registration request message through an IP Multimedia Subsystem (IMS) server according to the registration request message by the menu server.

10. The method of claim 8, wherein checking the status of the terminal further comprises determining whether a service menu exists for the terminal using service capability information of a subscriber of the terminal and terminal capability information of the terminal.

11. The method of claim 8, wherein generating the service menu further comprises generating a new service menu using the service capability information of the subscriber and the terminal capability information.

12. The method of claim 8, further comprising:
   receiving a service menu version check request message from the terminal to determine whether a service menu in the terminal is of a latest version;
   transmitting a service menu version check response message including version information of a latest service menu to the terminal;
   receiving a service menu download request message from the terminal; and
   transmitting a service menu download response message to the terminal, if the server authentication key for download is successfully authenticated.

13. The method of claim 8, wherein first-authenticating the terminal comprises:
  authenticating the terminal using an equipment Identifier (ID) of the terminal and the server authentication key by the menu server.

14. The method of claim 8, wherein the service menu for the terminal is a service menu screen configured by the menu server.

15. The method of claim 8, wherein the service menu for the terminal is service menu information on which the terminal configures a service menu screen.

16. The method of claim 8, further comprising:
  acquiring version information of a service menu to be downloaded and an authentication key for download, upon receipt of the download request message from the terminal; and
  authenticating the authentication key for download.

17. A method of providing an Internet Protocol (IP)-based service in a communication system, comprising the steps of:
  transmitting a version check message of a service menu in a terminal to a menu server after transmitting a registration request message to the menu server by the terminal;
  receiving a version check response message including a result of first-authenticating the terminal, a server authentication key, and version information of a latest service menu from the menu server by the terminal;
  authenticating the menu server by the terminal according to the server authentication key;
  determining a service menu to be downloaded based on the version information of the latest service menu included by the terminal, if the authentication of the menu server is successful;
  transmitting a service menu download request message to the menu server by the terminal;
  downloading the latest service menu from the menu server and displaying the latest service menu by the terminal;
  generating a new service menu by the menu server, if one of service capability information based on subscribed services and terminal capability information is changed;
  transmitting a version changed notify message of the service menu to the terminal;
  second authenticating the terminal, upon receipt of the version changed notify message from the terminal;
  determining to download the new service menu to the terminal, upon receipt of a download request message from the terminal after the second authentication; and
  transmitting the new service menu to the terminal so that the service menu can be displayed on the terminal.

18. The method of claim 17, wherein downloading and displaying the latest service menu further comprises displaying a service menu screen configured by the menu server.

19. The method of claim 17, wherein downloading and displaying the latest service menu comprises:
  downloading the latest service menu and configuring a service menu screen based on the latest service menu; and
  displaying the service menu screen.

20. The method of claim 17, further comprising displaying the service menu such that at least one service selected by a subscriber from the service menu is registered for accessing by a hot key.

21. A method of providing an Internet Protocol (IP)-based service in a communication system, comprising the steps of:
  comparing service capability information based on subscribed services with current service information of a terminal of the user received from the terminal by a server;
  transmitting a service object to the terminal by the server, if the service capability information of the user is different from the service information of the terminal;
  generating a new service menu by the server, if one of the service capability information and the terminal capability information is changed;
  transmitting a version changed notify message of the service menu to the terminal;
  authenticating the terminal, upon receipt of the version changed notify message from the terminal;
  determining to download the new service menu to the terminal, upon receipt of a download request message from the terminal after the authentication; and
  transmitting the new service menu to the terminal so that the service menu can be displayed on the terminal,
  wherein, before providing the service object, the server sends, to the terminal, a message including a server authentication key, and
  wherein the terminal authenticates the server according to the server authentication key received from the server.

22. The method of claim 21, wherein transmitting the service object further comprises downloading, to the terminal, all of service objects for the terminal or updated service objects.

23. The method of claim 21, wherein the service object is a menu of the subscribed services.

24. The method of claim 21, wherein the service object is a user application for implementing a subscribed service.

25. The method of claim 24, wherein transmitting the service object comprises:
  receiving a service menu version check request message from the terminal to determine whether a service menu in the terminal is of a latest version;
  transmitting a service menu version check response message including version information of a latest service menu to the terminal; and
  transmitting a user application to the terminal, upon receipt of a user application download request message from the terminal.

26. The method of claim 24, further comprising:
  determining whether the service capability information has been changed;
  transmitting a version changed notify message of a user application to the terminal, if the service capability information of the user has been changed; and
  transmitting the user application to the terminal, upon receipt of a user application download request message from the terminal.

* * * * *